(12) United States Patent
Demski

(10) Patent No.: US 7,178,874 B2
(45) Date of Patent: Feb. 20, 2007

(54) LATERAL HEAD RESTRAINT SYSTEM

(75) Inventor: Richard Demski, Appleton, WI (US)

(73) Assignee: Pierce Manufacturing Company, Appleton, WI (US)

( * ) Notice: Subject to any disclaimer, the term of this patent is extended or adjusted under 35 U.S.C. 154(b) by 0 days.

(21) Appl. No.: 11/117,722

(22) Filed: Apr. 28, 2005

(65) Prior Publication Data

US 2006/0244297 A1    Nov. 2, 2006

(51) Int. Cl.
    B60R 22/28    (2006.01)
(52) U.S. Cl. .................................................. 297/391
(58) Field of Classification Search ............... 297/397, 297/391, 396; D6/388
    See application file for complete search history.

(56) References Cited

U.S. PATENT DOCUMENTS

| | | | |
|---|---|---|---|
| 2,501,993 A | 3/1950 | Conradt | |
| 3,608,964 A | 9/1971 | Earl | |
| 4,130,318 A | 12/1978 | Hemmen et al. | |
| 4,619,483 A | 10/1986 | Dickey et al. | |
| 4,881,777 A * | 11/1989 | Dorshimer | 297/406 |
| 5,314,233 A | 5/1994 | Bostrom et al. | |
| 5,370,446 A | 12/1994 | Bancod | |
| 5,556,129 A | 9/1996 | Coman et al. | |
| 5,803,544 A | 9/1998 | Block et al. | |
| 6,129,421 A * | 10/2000 | Gilson et al. | 297/408 |
| 6,485,101 B2 | 11/2002 | Kassai et al. | |
| 6,648,416 B2 | 11/2003 | O'Connor et al. | |
| 6,682,143 B2 | 1/2004 | Amirault et al. | |
| 6,893,095 B2 * | 5/2005 | Schambre et al. | 297/406 |
| 2001/0040401 A1 * | 11/2001 | Lin | 297/397 |

* cited by examiner

Primary Examiner—Milton Nelson, Jr.
(74) Attorney, Agent, or Firm—Foley & Lardner LLP

(57) ABSTRACT

A head restraint system for use with a vehicle seat and configured to cushion the head of a seat occupant in a lateral direction relative to the vehicle seat is disclosed. The head restraint system generally includes a head restraint cushion configured to be supported at a lateral side of the vehicle seat and at a position that is perpendicularly fixed relative to the vehicle seat. The head restraint system also includes a support member having a first end for supporting the head restraint cushion and a second end for coupling the head restraint cushion to the vehicle seat. The head restraint cushion includes at least one missing portion for allowing improved peripheral communication by the seat occupant.

20 Claims, 6 Drawing Sheets

LATERAL HEAD RESTRAINT SYSTEM

FIELD

The present invention relates generally to the field of vehicle head restraint systems. More particularly, the present invention relates to vehicle head restraint systems configured to protect a seat occupant from injuries that may be sustained in the event of a lateral collision. The present invention further relates to vehicle head restraint systems suitable for use in emergency response type vehicles (e.g., fire-fighting vehicles, etc.).

BACKGROUND

Side impacts, roll-overs, sudden and/or significant lateral movements, or the like (collectively referred to herein as "lateral collisions") are a common type of vehicular collision and a type of collision that may cause injury to the vehicle seat occupants. Injuries that are commonly associated with lateral collisions include head and/or neck injuries. Such injuries often occur when the head of a seat occupant strikes or otherwise impacts a structural component of the vehicle (e.g., pillars, door structure, side panels, roof rails, side windows, etc.) or is permitted to move unrestrictedly in a lateral direction. A head and/or neck injury may further result from having an object striking the vehicle, or the object the vehicle is striking, enter the occupant compartment and impact the head of the seat occupant. In addition, it is possible for a side window of a vehicle to shatter during a lateral collision and for an injury to occur when the head of the seat occupant exits the occupant compartment through the window opening.

Accordingly, there is a need for a relatively simple, inexpensive and adaptable head restraint system intended to protect the head and/or neck of a vehicle seat occupant in the event of a lateral collision. There is also a need for a head restraint system that is suitable for use with vehicles having differently configured occupant compartments. There is also a need for a head restraint system that does not substantially limit (e.g., obstruct, etc.) communication (e.g., visual, audio, etc.) throughout and/or out of the vehicle. There is a further need to provide a head restraint system suitable for use with an emergency response type vehicle wherein a seat occupant is likely to be fitted with equipment (e.g., a self-contained breathing apparatus, etc.) limiting his or her ability to sit in a conventional vehicle seat. Accordingly, it would be desirable to provide for a head restraint system suitable for fulfilling one or more of these or other needs.

SUMMARY

One embodiment of the invention relates to a head restraint system for use with a vehicle seat. The head restraint system generally includes a head restraint cushion configured to be supported at a lateral side of the vehicle seat and at a position that is perpendicularly fixed relative to the vehicle seat. The head restraint system also includes a support member having a first end for supporting the head restraint cushion and a second end for coupling the head restraint cushion to the vehicle seat. The head restraint cushion includes at least one missing portion for allowing improved peripheral visibility by a seat occupant.

Another embodiment of the invention relates to a vehicle seat. The vehicle seat generally includes a lower seat, a seat back upwardly extending from the lower seat and including a seat back frame, and a head restraint system. The head restraint system includes a head restraint cushion supported at a lateral side of the vehicle seat and at a position that is perpendicularly fixed relative to the seat back. The head restraint system also includes a head restraint support structure having a first end for supporting the head restraint cushion and a second end for coupling the head restraint cushion to the seat back frame. The head restraint cushion includes at least one missing portion for allowing improved peripheral visibility by a seat occupant.

A further embodiment of the invention relates to a vehicle. The vehicle generally includes an occupant compartment having a side wall, a vehicle seat having a lateral side positioned adjacent to the side wall, and head restraint system coupled to the vehicle seat. The head restraint system generally includes a head restraint cushion supported at the lateral side of the vehicle seat and configured to be disposed between the head of the seat occupant and the side wall. The head restraint system also includes a support member having a first end for supporting the head restraint cushion and a second end for coupling the head restraint cushion to the vehicle seat.

The present invention further relates to various features and combinations of features shown and described in the disclosed embodiments. Other ways in which the features of the disclosed embodiments are accomplished will be described in the following specification or will become apparent to those skilled in the art after having read the following specification. Such other features are deemed to fall within the scope of the disclosed embodiments if they fall within the scope of the appended claims which follow.

DETAILED DESCRIPTION

Figure 1:
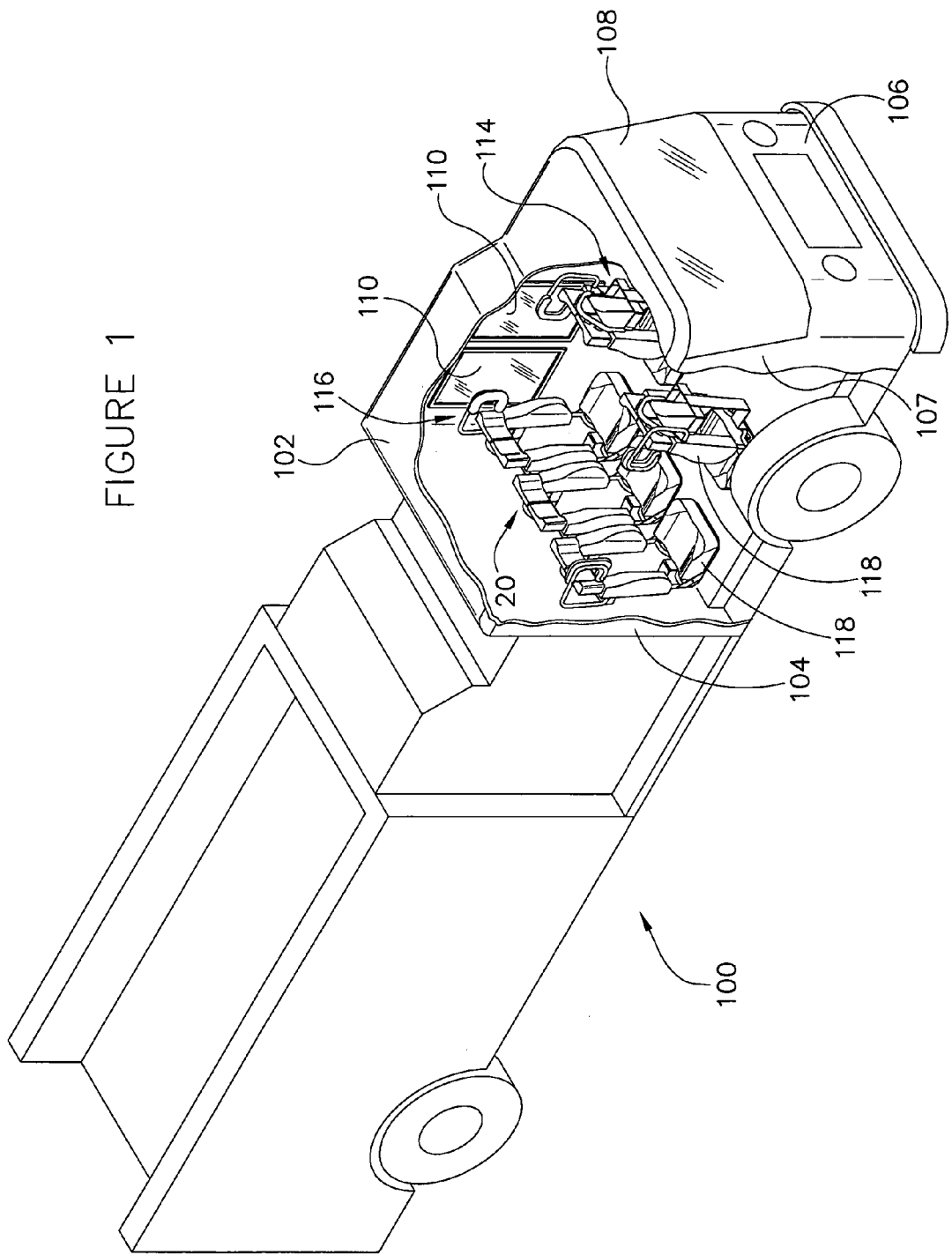
FIG. 1 is a perspective schematic view of an emergency response vehicle having a head restraint system shown according to an exemplary embodiment.

Before proceeding with the description of a number of exemplary embodiments of the invention, it is to be understood that the invention is not limited to the details or methodology set forth in the following description or illustrated in the drawings. The invention is capable of other embodiments or being practiced or carried out in various ways. It is also to be understood that the phraseology and terminology employed herein is for purpose of description and should not be regarded as limiting.

Referring generally to the FIGURES, a head restraint system 50 with components for providing a cushioned or softened surface in a lateral direction (e.g., transverse, side-to-side, etc.) relative to a vehicle seat is shown according to exemplary embodiments. It should be noted that the exemplary embodiments are described and illustrated as a being installed and used in conjunction with an emergency response type vehicle (e.g., a fire fighting vehicle, an ambulance, a hazardous material cleanup vehicle, etc.). However, head restraint system 50 is suitable for use with any vehicular application where the use of a head restraint system configured to protect the head and/or neck of a seat occupant in a lateral direction would be desirable including, but not limited to, automobiles, trucks, sport utility vehicles, vans, military vehicles, buses, trains, airplanes, etc. Accordingly, all such variations are included.

Referring to FIG. 1, head restraint system 50 is shown as being installed and used in conjunction with a vehicle 100. Vehicle 100 is shown schematically as a fire-fighting vehicle (e.g., a fire truck, etc.) having a cab or occupant compartment 102 for transporting one or more vehicle occupants. Occupant compartment 102 is supported about a platform or chassis (not shown) which is configured to support the components of vehicle 100 and is generally in the form of a frame assembly.

Occupant compartment 102 is at least partially defined by a pair of side walls 104 and a front wall 106. Side walls 104 and front wall 106 may include a combination of structural support members 107 (e.g., pillars, door structures, front and/or side panels, etc.) made from conventional materials (e.g., high-strength steel, steel alloys, other alloys, composites, plastic, etc.) for maintaining the rigidity of occupant compartment 102 and windows (e.g., a windshield 108 and a plurality of side windows 110, etc.) for allowing vehicle occupants to see out of occupant compartment 102. Side walls 104 may further include one or more access openings that preferably are covered by a movable panel or door (not shown) for allowing vehicle occupants to enter and exit vehicle 100.

Occupant compartment 102 houses one or more vehicle seats 20 for providing the vehicle occupants with a place to sit while vehicle 100 is in transit or otherwise moving. According to an exemplary embodiment, vehicle 100 is configured to transport seven vehicle occupants within occupant compartment 102, and includes a vehicle seat 20 for each intended vehicle occupant. Vehicle 100, as shown, included two forwardly facing vehicle seats (e.g., a driver seat and a passenger seat) in a first row (not shown), two rearwardly facing vehicle seats 20 in a second row 114, and three forwardly facing vehicle seats 20 in a third row 116. According to various alternative embodiments, occupant compartment 102 may be configured to receive any number of vehicle seats and have any of a variety of configurations with vehicle seats provided at any number of orientations relative to vehicle 100. In addition, vehicle 100 may be further configured to support additional vehicle occupants outside of occupant compartment 102.

The two vehicle seats 20 of second row 114 and the two outer vehicle seats 20 of third row 116 are shown as having lateral sides 118 positioned adjacent to side walls 104 of occupant compartment 102. Depending on the placement of vehicle seat 20, lateral side 118 may be on a right-side of vehicle seat 20 (e.g., the second row vehicle seat 20 on the driver-side of vehicle 100), or alternatively, may be on a left-side of vehicle seat 20 (e.g., the third row vehicle seat 20 on the driver-side of vehicle seat 20). According to another exemplary embodiment (not shown), vehicle seat 20 may be positioned so that vehicle seat 20 is substantially parallel with side walls 104. In such an embodiment, lateral side 118 would be facing either the front or rear of vehicle 100.

Figure 2:
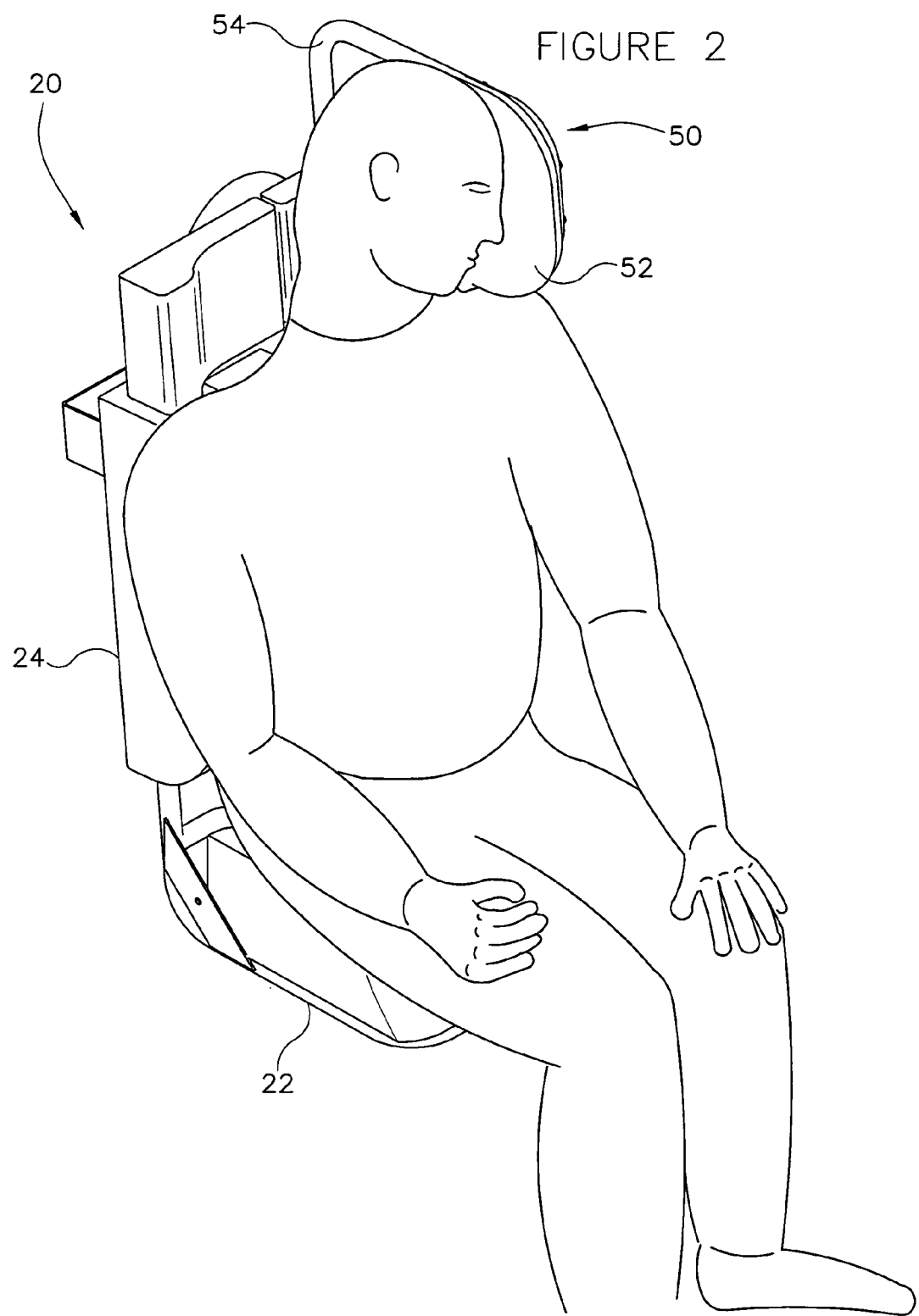
FIG. 2 is a perspective view of a vehicle seat having a head restraint assembly according to an exemplary embodiment and occupied by a seat occupant.

Referring to FIGS. 1 and 2, a head restraint system 50 is shown provided at lateral side 118 of vehicle seat 20. At such a position, head restraint system 50 is disposed between a seat occupant and side wall 104 (e.g., structural support members 107, side windows 110, or a combination thereof, etc.) and is configured to protect the head of a seat occupant from striking side wall 104, or any other vehicle structure and/or component, in the event of a lateral collision. According to another exemplary embodiment, an additional head restraint system 50 may be provided for vehicle seat 20 at the lateral side opposite lateral side 118.

Figure 3:
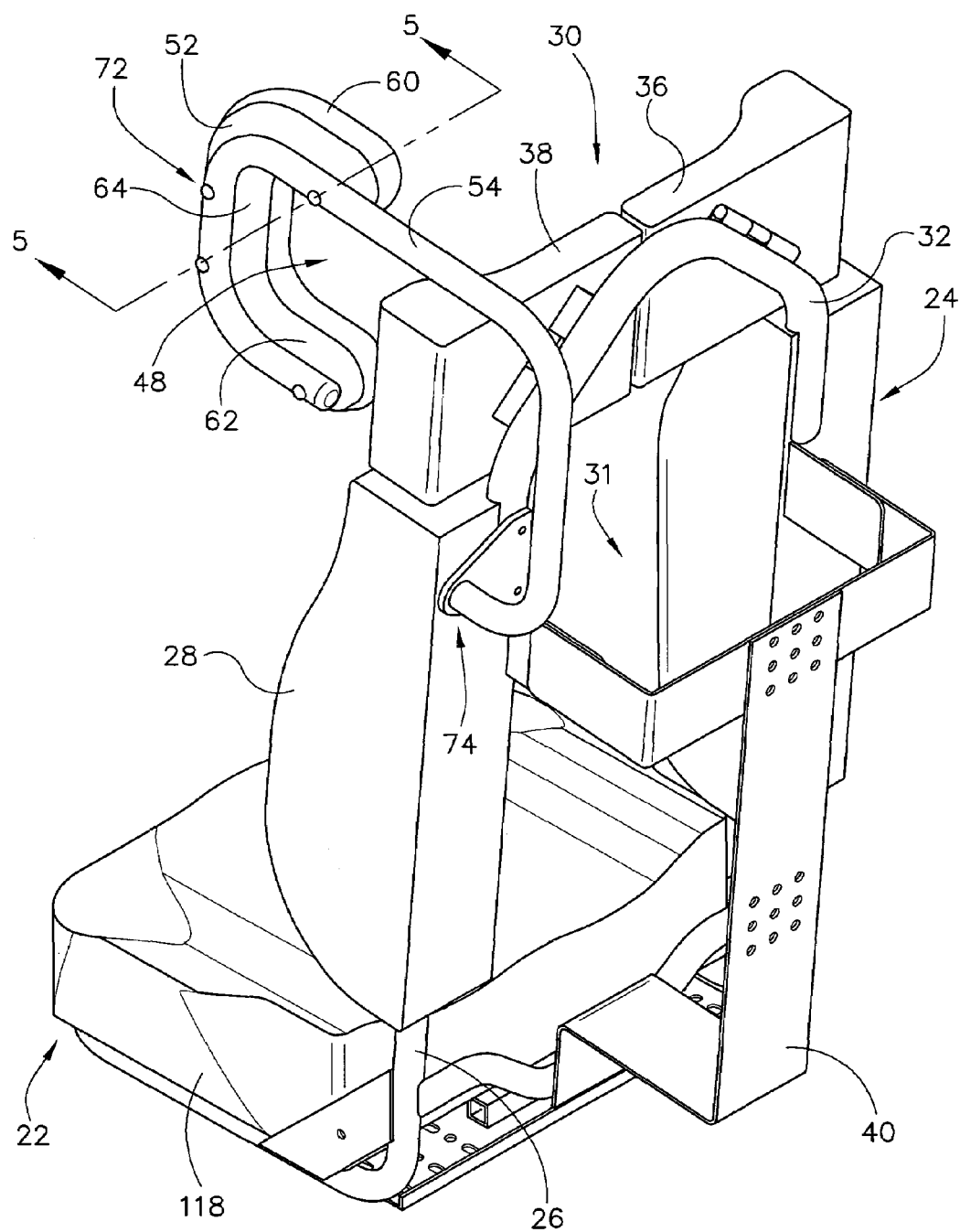
FIG. 3 is a perspective view of the head restraint system of FIG. 1 coupled to a vehicle seat according to an exemplary embodiment.
Figure 4:
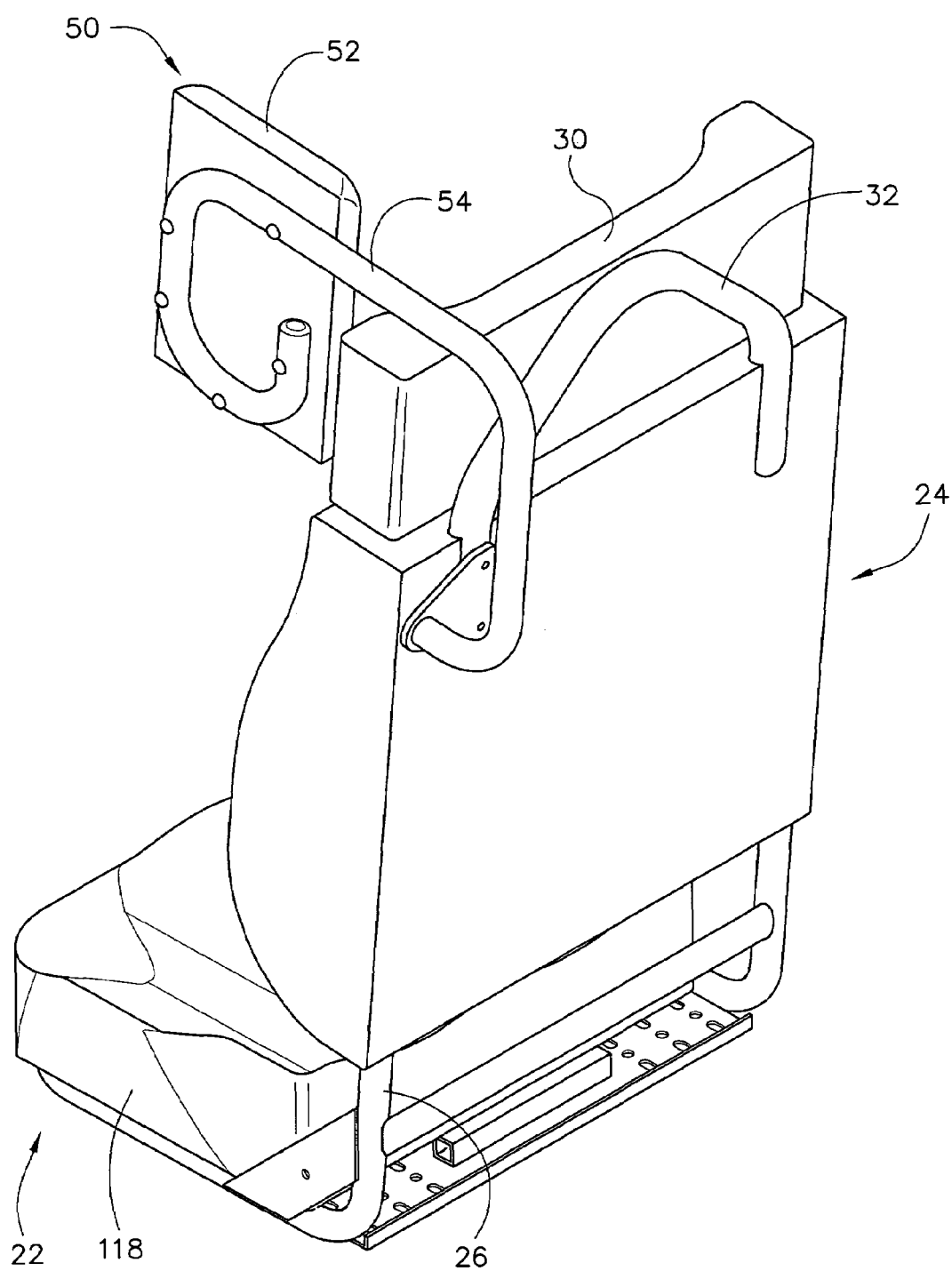
FIG. 4 is a perspective view of a head restraint system coupled to a vehicle seat according to an another exemplary embodiment.

Referring generally to FIGS. 3 and 4, vehicle seat 20 is shown as including a seat back 24 that upwardly extends from a lower seat (e.g., seat base, seat cushion, seat portion, etc.), shown as a seat bottom 22. Seat back 24 includes a seat frame 26 that is at least partially covered by a padded or cushioned member 28 to support and/or comfort to the seat occupant. The position (e.g., angle of inclination, height, etc.) of seat back 24 relative to seat bottom 22 may be fixed, or alternatively may be adjustable. Adjustability can be achieved by including a mechanism for allowing the position of seat back 24 relative to seat bottom 22 to be selectively adjusted (e.g., a recliner mechanism, etc.).

Vehicle seat 20 is further shown as including a head rest 30 for receiving and supporting a rear portion of the head of a seat occupant and a support member 32 for positioning head rest 30 at a desired position. Support member 32 is shown as being coupled to seat frame 26 of seat back 24, but alternatively may be integrally formed with seat frame 20. Head rest 30 may have any of a variety of suitable configurations and is not intended to be limited to the embodiments shown. According to the various alternative embodiments, a separate head rest and/or a corresponding support member may not be provided.

Referring particularly to FIG. 3, vehicle seat 20 is shown according to an exemplary embodiment. Vehicle seat 20 of FIG. 3 is configured to receive and/or support a self-contained breathing apparatus (SCBA). A self-contained breathing apparatus generally includes one or more pressurized canisters or cylinders (e.g., air tanks) that are intended to be coupled (e.g., strapped, etc.) to and used by emergency response personnel (e.g., firefighter) to protect against inhalation of noxious substances (e.g., smoke, fumes, etc.).

To accommodate a self-contained breathing apparatus, seat back 24 is shown as including a centrally-positioned elongated cavity 31 in which a cylinder of a self-contained breathing apparatus can be at least partially disposed. Cavity 31 is defined by a pair of spaced apart frame members (e.g., tubular frame members, etc.) of seat frame 26 which are at least partially covered by cushioned member 28. Vehicle seat 20 further includes a structure (e.g., mounting device, frame, etc), shown as a mounting bracket 40, to which a self-contained breathing apparatus can be coupled (e.g., clamped, clipped, bolted, snapped, locked, etc.) or otherwise secured.

Referring further to FIG. 3, vehicle seat 20 is also shown as including a head rest 30 having a configuration that allows a seat occupant to exit vehicle seat 20 while being fitted (e.g., equipped, etc.) with a self-contained breathing apparatus having a height that extends above head rest 30. To provide such function, head rest 30 is divided into a first segment 36 and a second segment 38, with first and second segments 36, 38 being movably coupled to a corresponding support member 32. According to an exemplary embodiment, a hinge 34 is coupled between first and second segments 36, 38 and the corresponding portion of support member 32. Hinge 34 allows first and second segments 36, 38 of head rest 30 to rotate upwardly and outwardly (e.g., flip-up, etc.) when engaged by a portion of a self-contained breathing apparatus as the seat occupant exits vehicle seat 20.

Use of the type of vehicle seat 20 illustrated in FIG. 3 may be particularly desirable in emergency response type vehicles. Employing such a vehicle seat may allow a self-contained breathing apparatus to be secured to vehicle seat 20 before being occupied by a seat occupant. In this manner, a seat occupant can couple the self-contained breathing apparatus to his or her body while seated in vehicle seat 20 which may save time otherwise spent removing the self-contained breathing apparatus from a separate location and strapping it on when arriving at the scene of the emergency. Further, having cavity 31 in seat back 24 may accommodate a situation where a seat occupant already has a self-contained breathing apparatus coupled to his or her back before entering vehicle 100.

FIG. 4 shows vehicle seat 20 according to another exemplary embodiment. Vehicle seat 20 of FIG. 4 is a more conventional vehicle seat configuration having a generally continuous (e.g., solid, etc.) seat back 24 for providing comfort and/or support to a seat occupant. According to various alternative embodiments, vehicle seat 20 may have any of a variety of suitable configurations including, but not limited to, bench seats, 60/40 split seats, bucket seats, etc. Accordingly, all such variations are included in the scope of the appended claims.

Referring to FIGS. 1 through 4, head restraint system 50 is shown coupled to vehicle seat 20 according to exemplary embodiments. For purposes of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

Referring to FIG. 2, head restraint system 50 is intended to provide a relatively simple, inexpensive and adaptable head restraint system configured to protect the head and/or neck of a seat occupant in the event of a lateral collision (e.g., a side impact, a rollover, a sudden and/or significant lateral movement of the vehicle, etc.). Head restraint system 50 generally includes a head restraint cushion 52 and a head restraint support member 54. Head restraint cushion 52 is configured to receive and cushion the head of a seat occupant in the event of a lateral collision, while head restraint support member 54 is configured to support head restraint cushion 52 at a desired position.

Figure 6:
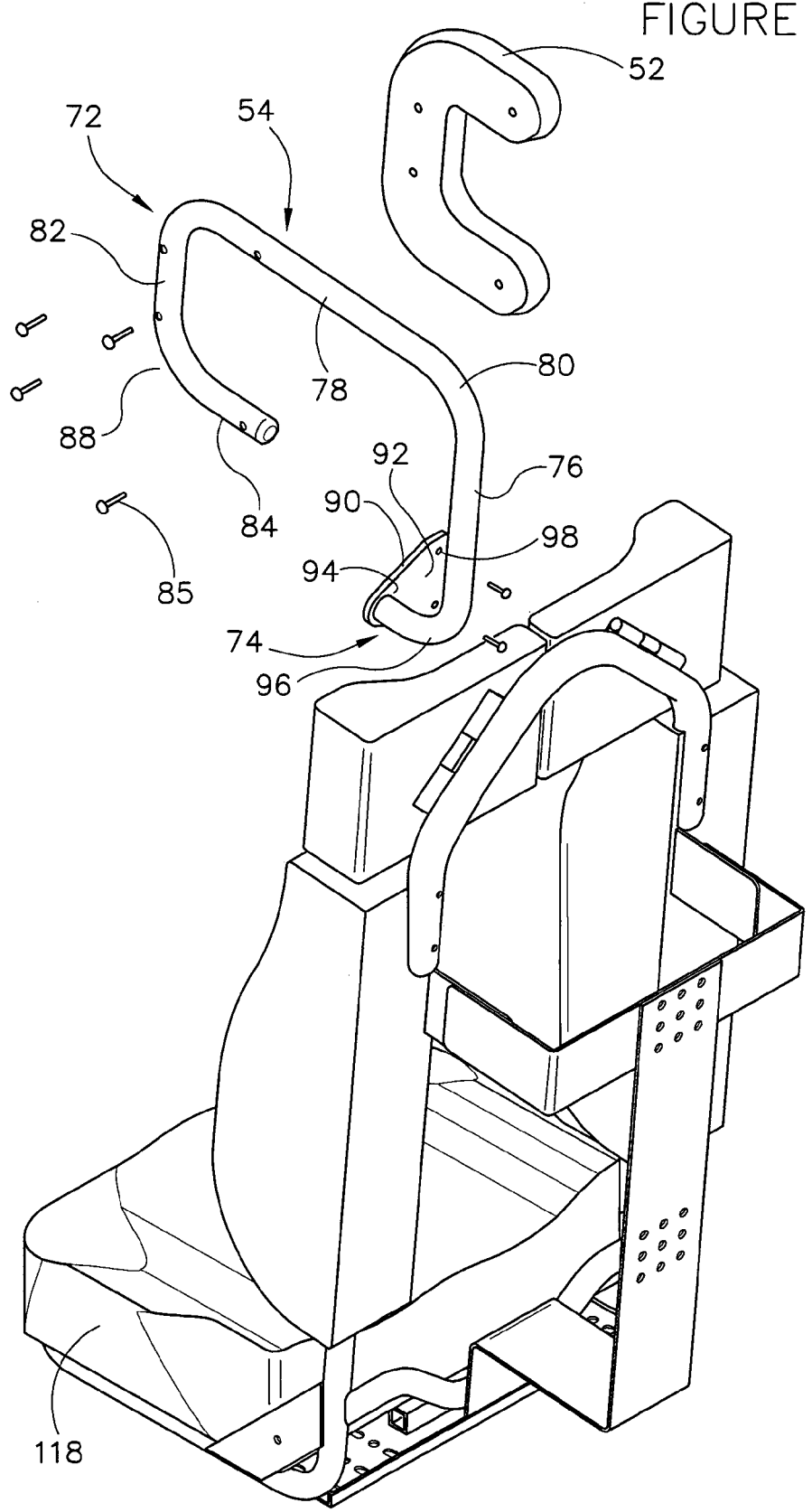
FIG. 6 is an exploded perspective view of a head restraint system of FIG. 3.

Head restraint cushion 52 is shaped and dimensioned to receive the head of a seat occupant. FIGS. 3 and 6 show head restraint cushion 52 according to an exemplary embodiment. Head restraint cushion 52 is shown as including an missing portion 48 (e.g., cutout portion, aperture, opening, void, etc.). Missing portion 48 may allow for improved peripheral visibility (e.g., in a lateral direction relative to the vehicle seat) by a seat occupant. Including missing portion 48 may be particularly desirable in applications where vehicle seat 20 is positioned adjacent to a window. In such an application, head restraint cushion 52 protects against having the head of a seat occupant strike the window, while still allowing the seat occupant to realize the benefits associated with a window.

Further, employing missing portion 48 may be desirable for improving communication (e.g., visual, audio, etc.) between vehicle occupants. For example, head restraint system 50 may be positioned on a lateral side 118 of vehicle seat 20 that is adjacent to another vehicle seat and/or an otherwise open area within occupant compartment 102. Missing portion 48 may allow vehicle occupants to better hear and/or see one another than if a generally solid cushion 52 was provided.

According to a preferred embodiment, head restraint cushion 52 is a C-shaped member shown as having a first leg 60, a second leg 62, and a third leg 63. First leg 60 extends substantially parallel with second leg 62, while third leg 64 is provided therebetween extends substantially perpendicular to first leg 60 and second leg 62. According to one exemplary embodiment, the free ends of first and second legs 60, 62 are positioned near (e.g., proximate, facing, etc.) seat back 24, while third leg 64 is positioned away (e.g., distal, etc.) from seat back 24 and is substantially parallel with seat back 24. According to another exemplary embodiment, the free ends of first and second legs 60, 62 may be positioned away from seat back 24, while third leg 64 may be positioned near seat back 24. According to various alternative embodiments, first leg 60, second leg 62, and third leg 63 may be positioned in any of a variety of positions relative to each other and/or relative to seat back 24.

Referring further to FIGS. 3 and 6, missing portion 48 is defined by first leg 60, second leg 62, and third leg 64. The configurations of first leg 60, second leg 62, and third leg 64 may be designed to optimize the desired size and/or location of missing portion 48. According to various alternative embodiments, head restraint cushion 52 may have any of a variety of configurations which allow peripheral visibility and/or improved audio receptiveness by a seat occupant. For example, head restraint cushion 52 may be any of a variety of shapes having missing portions 48 including, but not limited to, halo or donut shaped, L-shaped, V-shaped, or Z- or S-shaped (having two missing portions 48), I-shaped, etc. Further, head restraint cushion 52 may comprise one or more cushions (e.g., a plurality of cushions, a cluster of cushions, etc.) to provide for the desired configuration. For example, head restraint cushion 52 may include a separate cushion for each of first leg 60, second leg 62, and third leg 64. Each separate cushion may be independent of the other cushions or may be coupled to one or more the other cushions.

FIG. 4 shows head restraint cushion 52 according to another exemplary embodiment wherein head restraint cushion 52 has a generally solid configuration. While FIG. 4 shows head restraint cushion 52 as being a substantially rectangular member, head restraint cushion 52 may have any shape suitable for protecting a seat occupant (e.g., circular, polygonal, a shape having both linear and curvilinear edges, etc.). The thickness of head restraint cushion 52 may vary depending on the application and the material(s) used for head restraint cushion 52. The thickness of head restraint 52 may further be influenced by the availability of space between the vehicle structure and vehicle seat 20.

According to a preferred embodiment, head restraint cushion 52 is suitably dimensioned so that the same head restraint cushion 52 may accommodate seat occupants of different sizes without the need to adjust or replace head restraint cushion 52. According to a particularly preferred embodiment, head restraint cushion 52 is approximately 8 inches wide by 10 inches high and has a thickness of approximately 2 inches. Inclusion of such dimensions is not intended to be limiting and are included for exemplary purposes only. Those skilled in the art will realize that head restraint cushion 52 may be sized and shaped in a variety of ways depending of the application.

Figure 5:
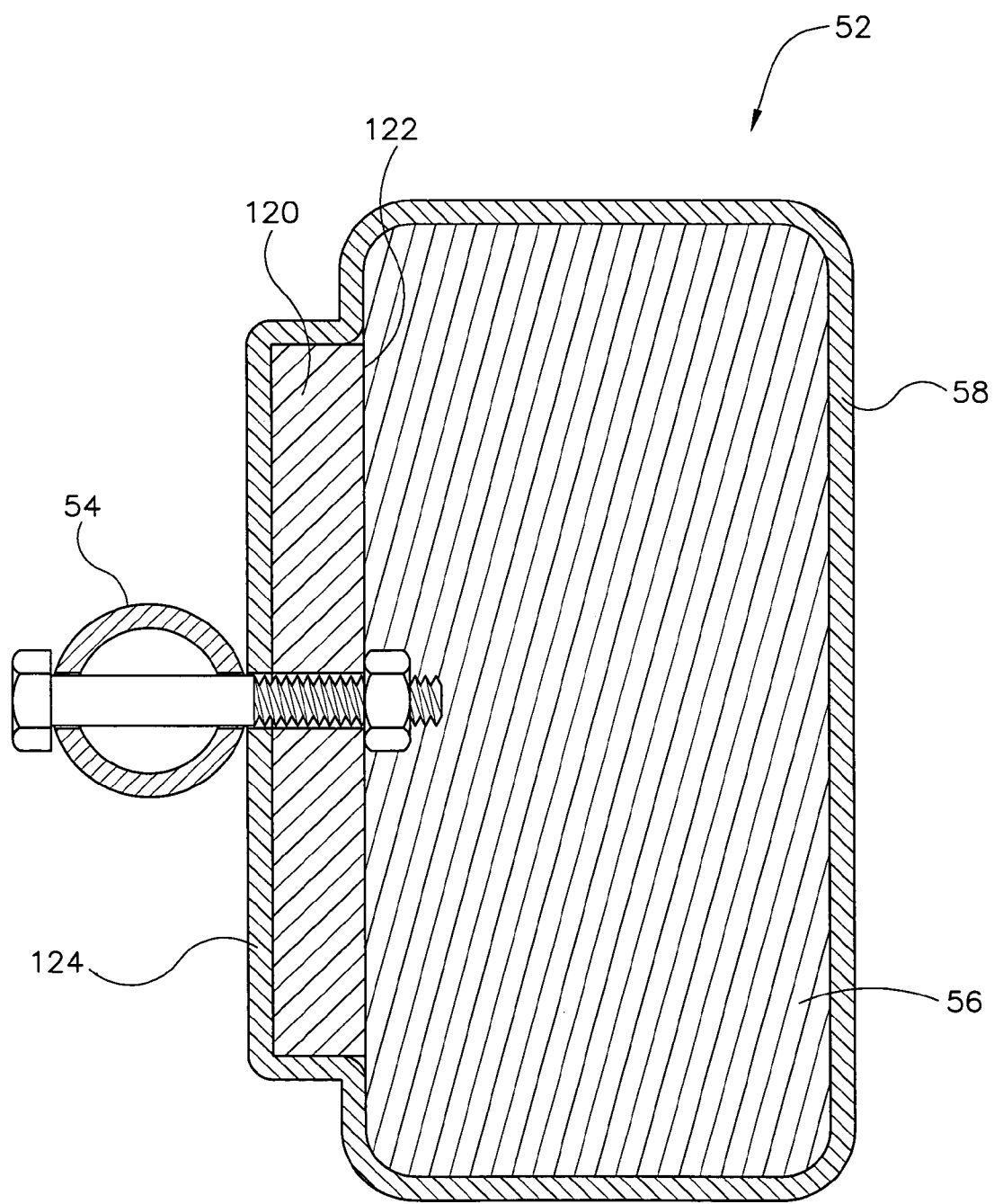
FIG. 5 is a cross section view of the head restraint system of FIG. 3 taken along a line 5—5 according to an exemplary embodiment.

FIG. 5 shows a cross section of head restraint cushion 52 according to an exemplary embodiment. Head restraint cushion 52 is shown as including a substrate 56, a cover 58, and a frame 60. Substrate 56 is a "padded" or "compressible" portion or layer that is configured to cushion and/or at least partially soften or absorb an impact force of the head of a seat occupant in the event of a lateral collision. Substrate 56 may be fabricated of any padded or compressible material suitable for providing a cushioned layer including, but not limited to, a polymeric material, natural fibers, a fluid retaining membrane or receptacle (e.g., air, gel, etc.), etc. Anyone of the aforementioned materials alone or in combination of two or more of the materials may provide substrate 56. According to a preferred embodiment, the material used for substrate 56 is a polymeric foam material (e.g., a urethane foam, a closed cell foam, an open celled foam, etc.).

Substrate 56 is shown disposed over frame 60. Frame 60 may be included to provide rigidity to substrate 56 and/or may be included to provide a structure to facilitate the coupling of substrate 56 to support member 58. Substrate 56 may be provided in front of frame 60, may be disposed around frame 60, or may be integrally formed with substrate 56. Frame 60 may be provided as a separate component, or alternatively may be integrally formed with substrate 56.

According to one exemplary embodiment, frame 60 includes a first surface 62 configured to be coupled to substrate 56 and a second surface 64 configured to be coupled to support member 54. Substrate 56 may be fixedly and/or detachably coupled to first surface 62 in any of a variety ways (e.g., bonding, fusing, welding, mechanical fasteners, etc.), and is preferably coupled to first surface 62 using an adhesive. Preferably, second surface 64 is configured to be detachably coupled to support member 54, but alternatively may be fixedly coupled. Second surface 64 is shown as including a plurality of threaded holes 66 configured to receive a threaded fastener (e.g., bolt, screw, etc.) for detachably coupling head restraint cushion 52 to support member 54. According to the various alternative embodiments, any suitable way of detachably coupling second surface 64 to support member 54. According to further alternative embodiments, substrate 56 may alone provide the desired rigidity of head restraint cushion 50 and/or may be provided with another suitable means for coupling substrate 56 to support member 54 thereby making use of frame 60 unnecessary.

Cover 58 is shown disposed over substrate 56 and frame 60. Cover 58 provides an A-surface (i.e., exposed surface, visual surface, etc.) for head restraint cushion 52 and is the surface configured to directly interface a seat occupant. Cover 58 may be provided for structural as well as aesthetic purposes. Cover 58 may be fixedly coupled to substrate 56 and/or frame 60, or alternatively may be detachably coupled. Cover 58 may be fixedly coupled to substrate 56 by being integrally formed with substrate 54 and/or frame 58 as a one piece unitary member, or may be fixedly coupled by techniques such as mechanical fasteners (e.g., staples, clips, rivets, etc.), stitching, adhesives, welding, fusing, bonding, etc. According to the various exemplary embodiments, a cover may not be employed and substrate 56 may be configured to provide the A-surface.

Detachably coupling cover 58 to substrate 56 and/or frame 60 may allow cover 58 to be more easily cleaned and/or replaced. If cover 58 is detachably coupled, cover 58 preferably should be configured to closely (e.g., tightly, snuggly, etc.) fit around substrate 56 to reduce and/or minimize the movement (e.g., shifting, bunching, etc.) of cover 58 relative to substrate 56 when disposed about substrate 56. Cover 58 may be detachably coupled to substrate 56 via a mechanical fastener (e.g., snaps, buckles, zipper, hook and loop fasteners, etc.), enveloping cover 58 about substrate 56, adhesives, or any other suitable technique. According to a preferred embodiment, cover 58 is made of vinyl, but alternatively may be made of any of a variety of materials such as leather, any woven or nonwoven material such as cotton, lycra, microfibers, etc., or combinations thereof.

Referring to FIGS. 2 through 4, support member 54 is shown coupled to vehicle seat 20 and configured to support head restraint cushion 52 along lateral side 118 at a position that is preferably adjacent to the head of a seat occupant. Support member 54 generally includes a first end 72 configured to be coupled to head restraint cushion 52 and a second end 74 configured to be coupled to vehicle seat 20 (preferably to seat back 24). While second end 74 may be coupled to any of a variety of structures within occupant compartment 102, coupling second end 74 to vehicle seat 20 (as opposed to side wall 104 for example) may improve the adaptability of head restraint system 50 by allowing head restraint system 50 to be conveniently and readily installed in vehicles having differently configured occupant compartments. For example, if the same or substantially the same vehicle seat 20 is used in a plurality of vehicles having occupant compartments with different configurations, coupling head restraint system 50 to vehicle seat 20 rather than to the vehicle structure may simplify incorporation.

FIG. 6 is an exploded view of head restraint system 50 illustrating the configuration of support member 54 according to an exemplary embodiment. Support member 54 is shown as a tubular member extending between first end 72 and second end 74. According to a preferred embodiment, support member 54 is a continuous tubular member made of a substantially rigid material (e.g. metal including steel, various other alloys, high strength metals such as stainless steel and steel alloys, plastic, composite material, etc.) having a generally circular cross-section. A tubular member with a circular cross-section advantageously provides a member that can be relatively easily shaped or otherwise formed into a desired shape for supporting head restraint cushion 52, while providing adequate rigidity with a relatively light-weight member.

According to the various alternative embodiments, support member 54 may be a tubular member having any other cross-section suitable for providing the desired rigidity (e.g., rectangular, triangular, octagonal, polygonal, etc.). Further, the cross-section (shape and size) of support member 54 may be relatively constant between first end 72 and second end 74, or alternatively may vary. Further, support member 54 is not limited to tubular members and may be any frame-structure capable of supporting head restraint cushion 52 at the desired position while being coupled to vehicle seat 20. For example, support member 54 may be configured as a relatively flat frame member, may include two or more segments or links coupled together, and/or may include one or more segments that are adjustable to allow the position of head restraint cushion 52 to be adjusted (e.g., adjustable in vertical direction relative to seat bottom 22 and/or in a longitudinal direction relative to seat back 24). According to a particularly preferred embodiment, support member 54 may be sufficiently rigid to support a lateral impact forces up to approximately 1700 pounds.

Support member 54 may be any of a variety of shapes depending upon the application and more particularly, the configuration of the vehicle in which head restraint system 50 is to be incorporated. According to an exemplary embodiment, support member 54 is shaped to extend head restraint cushion 52 upwardly and forwardly relative to vehicle seat 20 to support head restraint cushion 52 at a position intended to be adjacent to the head of a seat occupant in a lateral direction. Support member 54 is shown as including a first portion or leg 76 extending in a substantially upward direction relative to vehicle seat 20 and a second portion or leg 78 extending in a substantially outward direction. A first ninety degree bend 80 is shown separating first leg 76 from second leg 78. According to the various alternative embodiments, support member 54 may include any number of portions extending in any of a variety of directions to support head restraint cushion 52 in a desired lateral position. For example, a diagonal portion and/or a curvilinear portion may employed to support head restraint cushion 52.

Support member 54 is further shown as including a third portion or leg 82 extending in a substantially downward direction and a fourth portion or leg 84 extending in a substantially inward direction. A second ninety degree bend 86 is shown separating second leg 78 from third leg 82, while a third ninety degree bend 88 is shown separating fourth leg 84 from third leg 82. Fourth leg 84, third leg 82, and a forward portion of second leg 78 are configured to be disposed behind head restraint cushion 52 and intended to add rigidity to head restraint cushion 52. Fourth leg 84, third leg 82, and the forward portion of second leg 78 are shaped to correspond to the shape of head restraint cushion 52 (shown as being C-shaped). According to the various alternative embodiments, the shape of support member 54 at second end 72 may be varied to correspond to the shape of head restraint cushion 52. Preferably, support member 54 is at least disposed behind head restraint cushion 52 around the periphery of head restraint cushion 52, but alternatively may be selectively provided behind head restraint cushion 52.

Referring further to FIG. 6, support structure 54 is shown as including a plurality of holes configured to receive fasteners 85 for coupling head restraint cushion 52 to support member 54. As described above, head restraint cushion 52 may be fixedly or detachably coupled to support member 54 in any of a variety of suitable ways.

Support structure 54 is configured to be coupled to vehicle seat 20 at second end 74. According to a preferred embodiment, support structure 54 is configured to be coupled to seat frame 26 of seat back 24. Support structure 54 is shown as further including a bracket or mounting plate 90 at second end 74 for coupling support member 54 to seat frame 26. In the FIGURES, support member 54 is shown as being indirectly coupled to seat frame 26 by being directly coupled to support member 32 which is in turn coupled to seat frame 26. According to various alternative embodiments, support member 54 may be directly coupled to seat frame 26. Mounting plate 90 is includes a first region 92 configured to be coupled to seat frame 26 and a second region 94 configured to be coupled to first leg 76 of support member 54. A fourth ninety degree bend 96 is shown separating mounting plate 90 from first leg 76.

Mounting plate 90 is configured to offset first leg 76 from seat frame 26 in a lateral direction sufficient position head restraint cushion 52. Preferably, first leg 76, second leg 78, third leg 82, and fourth leg 84 of support structure 54 are each provided in the same lateral plane in an effort to minimize the overall width of head restraint system 50. Minimizing the overall width of head restraint system 50 may be particularly relevant in applications where there may not be substantial space between lateral side 118 of vehicle seat 20 and side wall 104.

First region 92 of mount plate 90 is shown as including a pair aperture 98 configured to receive a fastener for coupling support member 54 to seat frame 26. According to the various alternative embodiments, support member 54 may be coupled to seat frame 26 using other suitable techniques including, but not limited to, a welding process. Mounting plate 90 may be coupled to vehicle seat 20 anywhere along seat frame 26. Seat back 26 and/or mounting plate 90 may be configured so that the height of head restraint cushion 52 can be selectively adjustable to accommodate seat occupants of different size. It should be noted that provisions may also be made so that head restraint cushion 52 is selectively adjustable in a longitudinal direction (e.g., for and aft direction, etc.).

It is important to note that the construction and arrangement of the elements of the head restraint system provided herein are illustrative only. Although only a few exemplary embodiments of the present invention have been described in detail in this disclosure, those skilled in the art who review this disclosure will readily appreciate that many modifications are possible in these embodiments (such as variations in the types of seats for which the present invention is incorporated with, sizes, structures, shapes and proportions of the various elements, mounting arrangements, use of materials, combinations of shapes, etc. without materially departing from the novel teachings and advantages of the invention. For example, the vehicle seat 20 may be further equipped with conventionally known safety belt systems designed to secure a seat occupant to the vehicle seat in the event of a crash. Further, the materials used for the construction of head restraint cushion, including any substrate, frame, or cover portions, can be selected from any of those currently in use or otherwise, suitable for cushioned members or pads. Accordingly, all such modifications are intended to be within the scope of the invention.

While the present invention has been described in connection with a particularly preferred embodiment thereof, the invention is not to be limited by the drawings. The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the inventions as expressed in the appended claims.

What is claimed is:

1. A head restraint system for use with a vehicle seat, the head restraint system comprising:
a head restraint cushion configured to be supported at a lateral side of the vehicle seat and at a position that is fixed relative to the vehicle seat; and
a support member including a first end for supporting the head restraint cushion and a second end for coupling the head restraint cushion to the vehicle seat,
wherein the head restraint cushion includes at least one missing portion for allowing improved peripheral communication by a seat occupant,
wherein the missing portion is defined by a first leg and a second leg of the head restraint cushion that are substantially perpendicular to a third leg of the head restraint cushion.

2. The head restraint system of claim 1, wherein the head restraint cushion is provided by a one-piece cushion.

3. The head restraint system of claim 1, wherein the first end of the support member has a shape corresponding to the shape of the head restraint cushion.

4. The head restraint system of claim 1, wherein the head restraint cushion is substantially C-shaped.

5. The head restraint system of claim 1, wherein the first leg and the second leg have free ends configured to face the vehicle seat.

6. The head restraint system of claim 1, wherein the head restraint cushion further comprises a cover coupled to a substrate.

7. The head restraint system of claim 6, wherein the cover is intended to be permanently coupled to the substrate.

8. The head restraint system of claim 1, wherein the head restraint cushion comprises a frame for providing rigidity.

9. The head restraint system of claim 8, wherein the frame is configured to be detachably coupled to the first end of the support member.

10. The head restraint system of claim 1, wherein the support member is configured to extend upwardly in a first lateral plane relative to the seat back and forwardly in a second lateral plane relative to the seat back, the first lateral plane being substantially coplanar with the second lateral plane.

11. The head restraint system of claim 10, wherein the support member is provided by a one-piece member.

12. A vehicle seat comprising:
a lower seat;
a seat back upwardly extending from the lower seat and including a seat back frame;
a head restraint cushion supported at a lateral side of the vehicle seat and at a position that is substantially perpendicular relative to the seat back; and
a one-piece head restraint support structure having a first end for supporting the head restraint cushion and a second end for coupling the head restraint cushion to the seat back frame,
wherein the head restraint cushion includes at least one missing portion for allowing improved peripheral communication by a seat occupant.

13. The vehicle seat of claim 12, further comprising a mounting plate having a first portion configured to be coupled to the seat back frame and a second portion configured to support the second end of the support member, wherein the first portion of the mounting plate is laterally offset from the second portion of the mounting plate.

14. The vehicle seat of claim 12, wherein the seat back frame defines an elongated cavity configured to receive a portion of a self-contained breathing apparatus.

15. The vehicle seat of claim 12, wherein the second end of the head restraint support structure is directly coupled to the seat back frame.

16. The vehicle seat of claim 12, wherein the head restraint cushion is permanently fixed in the position that is substantially perpendicular relative to the seat back.

17. A vehicle comprising:
an occupant compartment having a side wall;
a vehicle seat having a lateral side positioned adjacent to the side wall; and
a head restraint system coupled to the vehicle seat, the head restraint system comprising:
a head restraint cushion supported at the lateral side of the vehicle seat and configured to be disposed between the head of the seat occupant and the side wall; and
a one-piece support member extending both upwardly and forwardly relative to the vehicle seat the support member including a first end for supporting the head restraint cushion and a second end for coupling the head restraint cushion to the vehicle seat,
wherein the head restraint cushion is permanently fixed at an orientation that is substantially perpendicular to the vehicle seat.

18. The vehicle of claim 17 wherein the side wall of the occupant compartment includes a window and the head restraint cushion is supported adjacent to the window.

19. The vehicle of claim 18 wherein the head restraint cushion includes a missing portion for allowing the seat occupant to see out of the window.

20. The vehicle of claim 17, wherein the vehicle is an emergency response type vehicle and the vehicle seat includes a seat back defining a cavity configured to receive a portion of a self-contained breathing apparatus.

* * * * *